Figure 1:
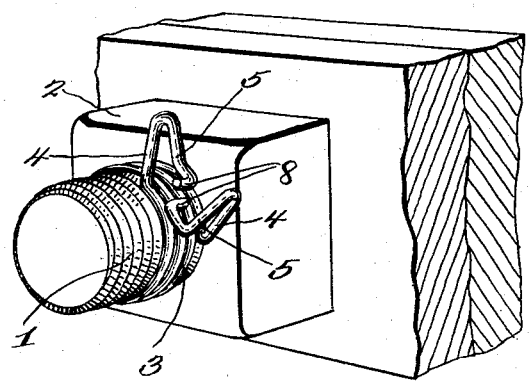

W. R. MILLARD.
NUT LOCK.
APPLICATION FILED JUNE 5, 1914.

1,172,722.

Patented Feb. 22, 1916.

Witnesses
A. R. Wolfe,
Thomas T. Boswell.

Inventor
William R. Millard,
By D. Swift & Co.,
his Attorneys

THE COLUMBIA PLANOGRAPH CO., WASHINGTON, D. C.

UNITED STATES PATENT OFFICE.

WILLIAM R. MILLARD, OF CLEBURNE, TEXAS.

NUT-LOCK.

1,172,722.  Specification of Letters Patent. Patented Feb. 22, 1916.

Application filed June 5, 1914. Serial No. 843,153.

*To all whom it may concern:*

Be it known that I, WILLIAM R. MILLARD, a citizen of the United States, residing at Cleburne, in the county of Johnson and State of Texas, have invented a new and useful Nut-Lock; and I do hereby declare the following to be a full, clear, and exact description of the invention, such as will enable others skilled in the art to which it appertains to make and use the same.

This invention relates to a new and useful nut lock, and the object in view is to provide a simple and efficient nut lock having improved features of construction.

One of the features of construction is the provision of a spring coil constructed from a single length of spring wire material, the opposite ends of the wire material extend laterally and provided with a return bent portion, forming arms. The spring coils are designed to fit tightly and frictionally the threads of the bolt, and by pressing said arms toward one another, said coils may be expanded, so that the device may be partially rotated in one direction or the other. The arms are provided with inter-engaging locking means to hold the arms together, so that the device may be unscrewed from the threads of the bolt.

In practical fields the details of construction may necessitate alterations, falling within the scope of what is claimed.

The invention comprises further features and combination of parts, as hereinafter set forth, shown in the drawings and claimed.

Figure 2:
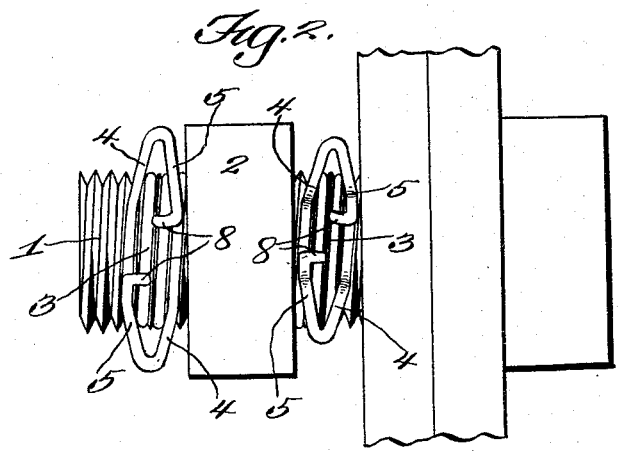
Figure 3:
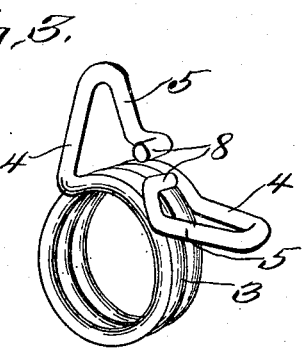
Figure 4:
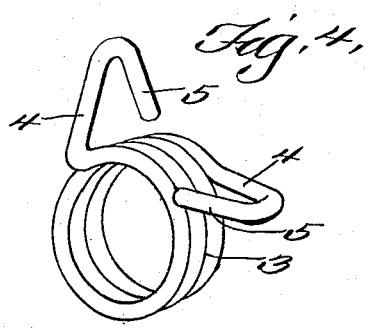

In the drawings:—Figure 1 is a view in perspective showing the improved nut locking device as applied. Fig. 2 is a plan view showing two of the nut locking devices employed. Fig. 3 is an enlarged detail view of the device. Fig. 4 is a perspective view illustrating another form of construction.

Referring more especially to the drawings, 1 designates the bolt having the usual form of nut 2.

The nut locking device comprises a single length of spring wire constructed to form a spring coil 3, designed to engage the threads of the shank of the bolt. The opposite ends of the spring wire material terminate in lateral extending portions 4 provided with a return bent portion 5, thereby forming arms, to be grasped by the fingers to pull the arms together, whereby the coils may be expanded for detaching the nut locking device. When said arms are brought together, they are locked in such positions by the hooks 8, engaging the lateral extending portions 4. In Fig. 2 there are two nut locking devices employed, one upon each side of said nut, both of which act together to lock the nut in position.

The invention having been set forth, what is claimed as new and useful is:—

1. A nut lock device comprising a single length of wire material constructed to form a spring coil having several convolutions, the end portions of the material beyond the coil being formed into loops, one arm of each loop at its extremity terminating in a hook, each hook extending toward and being substantially opposite the other arm of each loop and being designed to engage said other arm, thereby holding the loops pressed toward each other for expanding the coil whereby the same may be detached from a bolt shank.

2. A nut lock device comprising a single length of wire material constructed to form a spring coil having several convolutions, the end portions of the end convolutions of the coil being extended substantially tangentially to the coil forming substantially triangular shaped loops, the extremity of one arm of each of said loops having a hook extending toward the opposite arm of said loop, said hooks designed to engage diagonally opposite arms of the opposite loops to hold the loops pressed together, thereby holding the convolutions of the coil expanded, whereby the coil may be easily detached from the bolt shank.

In testimony whereof I have signed my name to this specification in the presence of two subscribing witnesses.

WILLIAM R. MILLARD.

Witnesses:
C. C. BYERS,
S. O. CONLEY.

Copies of this patent may be obtained for five cents each, by addressing the "Commissioner of Patents, Washington, D. C."